UNITED STATES PATENT OFFICE.

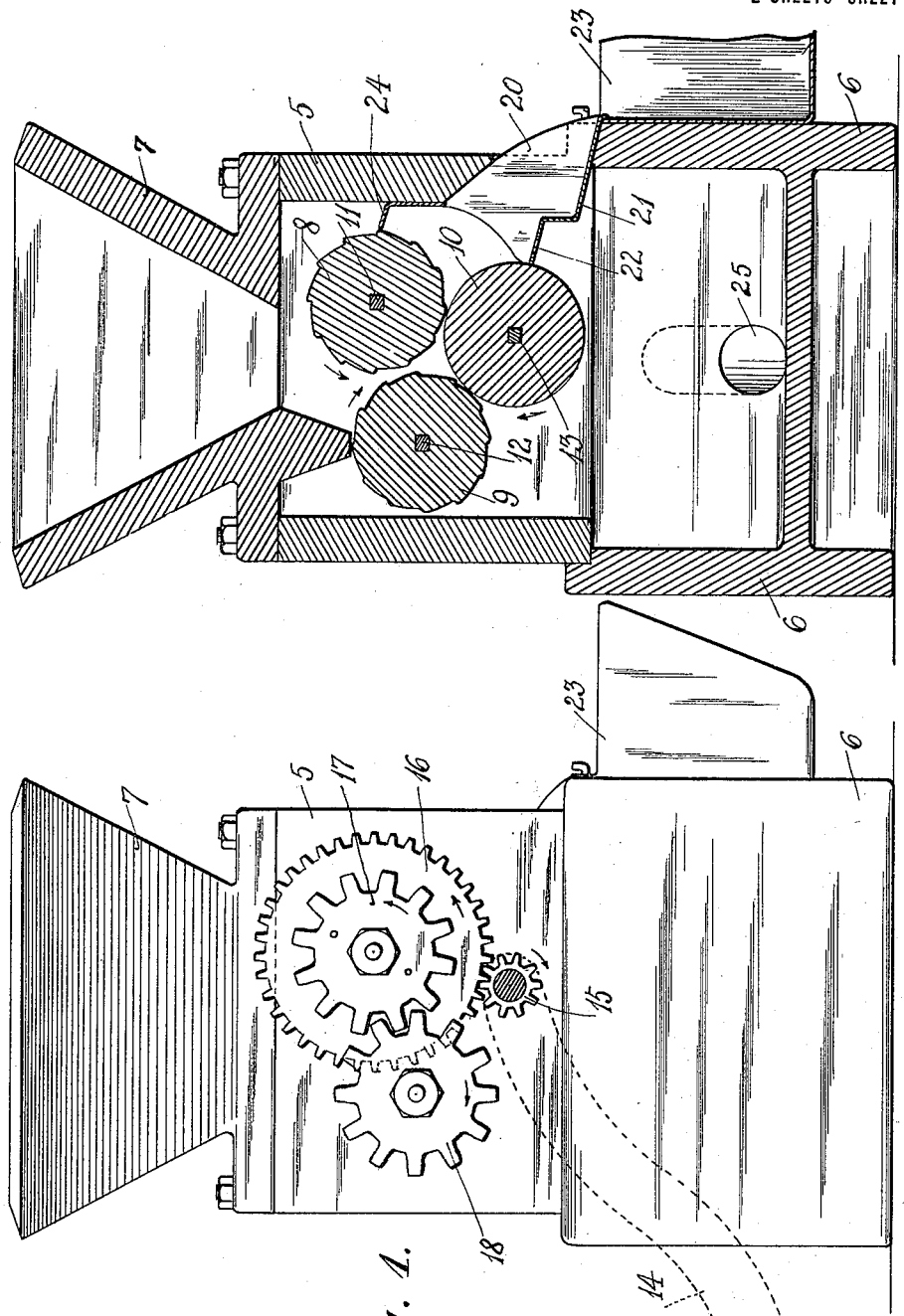

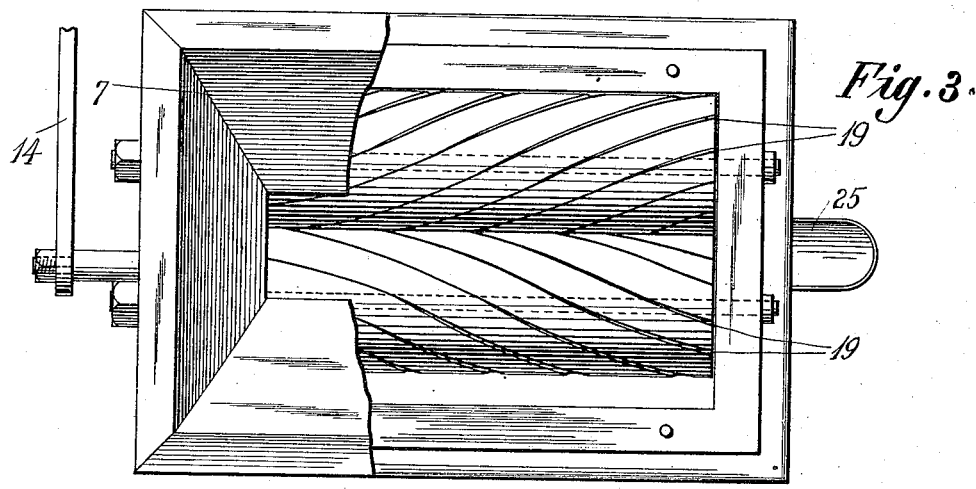
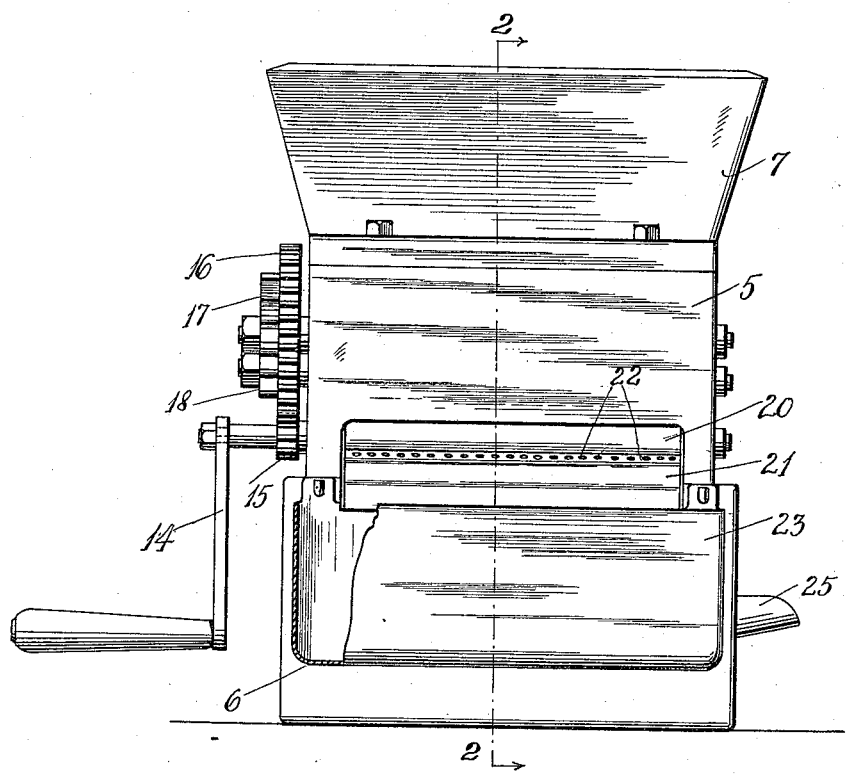

CHARLES DOMA, OF NEWARK, NEW JERSEY.

FRUIT-PRESS.

1,147,222.

Specification of Letters Patent.  Patented July 20, 1915.

Application filed January 23, 1915. Serial No. 3,970.

*To all whom it may concern:*

Be it known that I, CHARLES DOMA, a subject of the King of Hungary, residing at Newark, in the county of Hudson and State of New Jersey, have invented new and useful Improvements in Fruit-Presses, of which the following is a specification.

My invention relates to a fruit press and has as its principal object to provide a household article by means of which any housewife may easily and effectively press out the juice of grapes, berries, olives, tomatoes and the like, separating therefrom the residue or solid substance.

A further object of my invention is to provide a device of the character described which is simple in construction, easy to handle, inexpensive to manufacture and thus within the reach of every housewife.

With the foregoing and other objects in view, my invention consists in the particular construction, arrangement and combination of parts, hereinafter more specifically set forth and illustrated in the accompanying drawings, in which:

Figure 1 is an end view, Fig. 2 a vertical cross-section, Fig. 3 a plan view and Fig. 4 a front elevational view of my device.

Throughout the several views the same part is designated by the same reference character.

Referring more particularly to the drawings, 5 is a casing made of wood, metal or any other suitable material, removably supported on a vat 6 and provided, at its top, with a hopper 7, through which the fruit is fed into the apparatus.

From the hopper 7 the fruit gets over cylindrical squeezers 8 and 9, rotating in inverse directions as indicated by the arrows and is thus drawn in between same, being squeezed thereby. The juice squeezed out and the solid residues then drop on a cylindrical transporter 10 turning in the direction indicated by the arrow in Fig. 2.

The squeezers 8 and 9 and the transporter 10 are mounted on shafts 11, 12 and 13, respectively, journaled in the end walls of the casing 5, with one end extending through said end wall and carrying thereon gears in engagement with each other, as shown in Fig. 1. The end of the shaft 13 is still further extended and a crank handle 14 attached to it. When actuating this crank handle, the pinion 15 mounted on the shaft 13 engages a spur gear 16 mounted on the shaft 11, integral with another spur gear 17 which in its turn engages the spur gear 18 mounted on the shaft 12 and thereby all the shafts are forcibly rotated. The respective diameters of the gearing are so calculated that the two squeezers 8 and 9 rotate at the same speed, whereas the transporter 10 rotates at a higher speed.

The squeezers 8 and 9 are provided with helical grooves 19 all around their surface, so as to grip the fruit securely, whereas the transporter 10 has a smooth surface.

The front wall of the casing 5 is provided with an opening 20 at its bottom through which the solid substances leave the casing 5 over a screen 21 provided with perforations such as 22 all along its length through which the liquid juice enters the vat 6. The screen 21 has its inner edge close to the transporter 10, so that no juice or residue may get past the screen 21. A trough 23 may be hung under the opening 20 for taking up the residue leaving the casing 5.

A scraper 24 is attached to the inside of the front wall of the casing 5 so as to scrape off the squeezer 8 any liquid or solid substance that may adhere thereto.

An outlet 25 is provided in the vat for an obvious purpose and may be replaced by a cock.

I claim:

A fruit press, comprising, in combination, a pair of cylindrical squeezers provided with helical grooves in their surfaces, a cylindrical transporter underneath and close to said squeezers, said cylindrical members mounted on shafts journaled in the ends of a casing containing same, gears mounted on the ends of said shafts protruding through one of the walls of said casing, a crank handle attached to the end of one of said shafts and adapted to actuate all of said shafts by means of said gears, a screen mounted in said casing close to said transporter, provided with perforations and projecting into an opening made in said casing, a container for liquids supporting said casing, and a scraper attached to the inside of the front wall of said casing in engagement with one of said squeezers, substantially as and for the purpose set forth.

CHARLES DOMA.

Witnesses:
 JOHN MUNKÁESG,
 JOHN TERVEY.